US011305348B2

United States Patent
Chase et al.

(10) Patent No.: US 11,305,348 B2
(45) Date of Patent: *Apr. 19, 2022

(54) METHODS FOR PRODUCING GAS TURBINE ENGINE ROTORS AND OTHER POWDERED METAL ARTICLES HAVING SHAPED INTERNAL CAVITIES

(71) Applicant: HONEYWELL INTERNATIONAL INC., Morris Plains, NJ (US)

(72) Inventors: Deanna Pinar Chase, Tempe, AZ (US); Amandine Miner, Tempe, AZ (US); Harry Lester Kington, Scottsdale, AZ (US); Anthony Martinez, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/996,569

(22) Filed: Aug. 18, 2020

(65) Prior Publication Data

US 2020/0376561 A1 Dec. 3, 2020

Related U.S. Application Data

(62) Division of application No. 16/040,199, filed on Jul. 19, 2018, now Pat. No. 10,807,166, which is a
(Continued)

(51) Int. Cl.
*B22F 5/00* (2006.01)
*B22F 3/15* (2006.01)
(Continued)

(52) U.S. Cl.
CPC ............... *B22F 5/009* (2013.01); *B22F 3/15* (2013.01); *B22F 3/24* (2013.01); *B23P 15/006* (2013.01);
(Continued)

(58) Field of Classification Search
CPC ............... B23P 15/006; F05D 2230/20; F05D 2230/22; F05D 2230/23; F05D 2260/94;
(Continued)

(56) References Cited

U.S. PATENT DOCUMENTS

| 737,042 A | 8/1903 | Stumpf |
| 2,941,780 A | 6/1960 | Von Der Nuell et al. |

(Continued)

FOREIGN PATENT DOCUMENTS

| DE | 3802763 A1 | 8/1989 |
| EP | 1978208 A2 | 10/2008 |

(Continued)

OTHER PUBLICATIONS

Library of Manufacturing, Sand Casting for Manufacture, Sand Casting; http://thelibraryofmanufacturing.com/metalcasting_sand.html.

(Continued)

*Primary Examiner* — Christopher J Besler
(74) *Attorney, Agent, or Firm* — Lorenz & Kopf, LLP

(57) ABSTRACT

Embodiments of a methods for producing gas turbine engine rotors and other powdered metal articles having shaped internal cavities are provided. In one embodiment, the method includes consolidating a powdered metal body utilizing a hot isostatic pressing process to produce a rotor preform in which elongated sacrificial tubes are embedded. Acid or another solvent is directed into solvent inlet channels provided in the elongated sacrificial tubes to chemically dissolving the elongated sacrificial tubes and create shaped cavities within the rotor preform. The rotor preform is subject to further processing, such as machining, prior to or after chemical dissolution of the elongated sacrificial tubes to produce the completed gas turbine engine rotor.

7 Claims, 7 Drawing Sheets

Related U.S. Application Data division of application No. 14/492,302, filed on Sep. 22, 2014, now Pat. No. 10,040,122.

(51) Int. Cl.

| | | |
|---|---|---|
| *B23P 15/00* | (2006.01) | |
| *F01D 5/04* | (2006.01) | |
| *F01D 5/34* | (2006.01) | |
| *B22F 3/24* | (2006.01) | |
| *B22F 5/10* | (2006.01) | |
| *F01D 5/02* | (2006.01) | |
| *F01D 5/28* | (2006.01) | |

(52) U.S. Cl.
CPC ... *B22F 2003/247* (2013.01); *B22F 2005/103* (2013.01); *F01D 5/02* (2013.01); *F01D 5/043* (2013.01); *F01D 5/28* (2013.01); *F01D 5/34* (2013.01); *F05D 2230/22* (2013.01); *F05D 2260/94* (2013.01); *F05D 2260/941* (2013.01)

(58) Field of Classification Search
CPC ..... F05D 2260/941; B21K 3/04; B22F 5/009; B22F 3/12; B22F 3/15; B22F 3/1121; B22F 2003/151; B22F 2005/103; F01D 5/34; F01D 5/02; F01D 5/021; F01D 5/04; F01D 5/048; F01D 5/047
See application file for complete search history.

(56) References Cited

U.S. PATENT DOCUMENTS

| | | |
|---|---|---|
| 3,291,446 A | 12/1966 | Huebner, Jr. |
| 3,399,443 A | 9/1968 | Roy et al. |
| 3,847,506 A | 11/1974 | Straniti |
| 3,927,952 A | 12/1975 | Kirby |
| 4,062,638 A | 12/1977 | Hall, Jr. |
| 4,183,456 A | 1/1980 | Schilling et al. |
| 4,335,997 A | 6/1982 | Ewing et al. |
| 4,383,854 A | 5/1983 | Dembowski et al. |
| 4,659,288 A | 4/1987 | Clark et al. |
| 4,723,999 A | 2/1988 | Hasselstrom |
| 4,813,848 A | 3/1989 | Novotny |
| 4,886,535 A | 12/1989 | Bhatti |
| 5,066,454 A | 11/1991 | Hanson |
| 5,269,058 A | 12/1993 | Wiggs et al. |
| 5,292,385 A | 3/1994 | Kington |
| 5,469,618 A | 11/1995 | LeMonds et al. |
| 5,854,966 A | 12/1998 | Kampe et al. |
| 6,120,570 A | 9/2000 | Packer et al. |
| 7,097,422 B2 | 8/2006 | Rice et al. |
| 7,112,301 B2 | 9/2006 | Thorne et al. |
| 7,163,121 B1 | 1/2007 | Stouffer et al. |
| 7,261,855 B2 | 8/2007 | Troitski et al. |
| 7,481,625 B2 | 1/2009 | Kim |
| 7,641,847 B2 | 1/2010 | Voice et al. |
| 7,687,021 B2 | 3/2010 | Imbourg et al. |
| 7,832,986 B2 | 11/2010 | Baker et al. |
| 7,887,299 B2 | 2/2011 | Xiao |
| 7,900,811 B1 | 3/2011 | Alman et al. |
| 8,157,514 B2 | 4/2012 | Reyes et al. |
| 8,206,122 B2 | 6/2012 | Rojanskiy et al. |
| 8,408,446 B1 | 4/2013 | Smoke et al. |
| 9,714,577 B2 | 7/2017 | Kington et al. |
| 10,040,122 B2 * | 8/2018 | Chase ............... B22F 3/15 |
| 2002/0122725 A1 | 9/2002 | Daam et al. |
| 2002/0122738 A1 | 9/2002 | Van Daam et al. |
| 2008/0115358 A1 | 5/2008 | Rice et al. |
| 2008/0304974 A1 | 12/2008 | Marshall et al. |
| 2009/0119919 A1 | 5/2009 | Kington et al. |
| 2009/0226338 A1 | 9/2009 | Troitski et al. |
| 2011/0182745 A1 | 7/2011 | Suciu et al. |
| 2012/0160900 A1 | 6/2012 | Rigal et al. |
| 2012/0308381 A1 | 12/2012 | Suciu et al. |
| 2013/0202476 A1 | 8/2013 | Hellman et al. |
| 2013/0272882 A1 | 10/2013 | Mittendorf |

FOREIGN PATENT DOCUMENTS

| | | |
|---|---|---|
| EP | 2058474 A2 | 5/2009 |
| EP | 2230382 A2 | 9/2010 |
| EP | 2650474 A2 | 10/2013 |
| EP | 2865482 A1 | 9/2015 |
| FR | 1122205 A | 9/1956 |
| GB | 1458524 A | 12/1976 |
| WO | 2005049251 A1 | 6/2005 |

OTHER PUBLICATIONS

Wu, Shuilin, et al.; Pore formation mechanism and characterization of porous NiTi shape memory alloys synthesized by capsule-free hot isostatic pressing; ScienceDirect, Acta Materialia 55 (2007) 3437-3451; Copyright 2007.

* cited by examiner

METHODS FOR PRODUCING GAS TURBINE ENGINE ROTORS AND OTHER POWDERED METAL ARTICLES HAVING SHAPED INTERNAL CAVITIES

CROSS-REFERENCE TO RELATED APPLICATION

This application is a divisional of U.S. application Ser. No. 16/040,199, filed with the United States Patent and Trademark Office on Jul. 19, 2018, which is a divisional of U.S. application Ser. No. 14/492,302, filed Sep. 22, 2014, and issued as U.S. Pat. No. 10,040,122, which issued on Aug. 7, 2018, the entire disclosures of which are incorporated by reference herein.

TECHNICAL FIELD

The present disclosure relates generally to powder metallurgy and, more particularly, to methods for producing gas turbine engine rotors and other articles having shaped internal cavities, as well as to gas turbine engine rotors produced utilizing such methods.

BACKGROUND

Hot Isostatic Pressing (HIP) processes are often utilized to produce Powdered Metal (PM) articles or components. During an exemplary HIP process, a PM alloy is loaded into the cavity of a specialized capsule or "HIP container." The HIP container is then subject to elevated temperatures and isostatic pressures sufficient to consolidate or sinter the PM alloy into a coherent mass or "component preform," which may have the near net shape of the finished component. After HIP processing, the component preform is removed from the HIP container and subjected to additional machining to define the more detailed features of the finished PM component. HIP processes of this type are employed across a wide range of industries to produce a number of different PM components. The aerospace industry, for example, has developed HIP processes suitable for producing Gas Turbine Engine (GTE) components including compressor rotors and turbine rotors (collectively referred to herein as "GTE rotors"). In certain instances, it may be desirable to produce shaped cavities within a PM component for a particular purpose. For example, in the case of a GTE rotor, it may be desirable to produce shaped cavities within the rotor hub for cooling or stress relief purposes. This can present a difficulty, however, in that such shaped cavities may have portions or regions that are not accessible from the exterior of the PM component and/or that have relatively complex three dimensional geometries. As a result, it can be impractical, if not impossible, to produce such shaped cavities utilizing conventional machining techniques.

BRIEF SUMMARY

Embodiments of a method for producing GTE rotors having shaped internal cavities are provided. In one embodiment, the method includes consolidating a PM body utilizing a hot isostatic pressing process to produce a rotor preform in which elongated sacrificial tubes are embedded. Acid or another solvent is directed into solvent inlet channels provided in the elongated sacrificial tubes to chemically dissolving the elongated sacrificial tubes and create shaped cavities within the rotor preform. The rotor preform is subject to further processing, such as machining, prior to or after chemical dissolution of the elongated sacrificial tubes to produce the completed GTE rotor.

Embodiments of methods for manufacturing PM components having shaped internal cavities are also provided. In one embodiment, the method includes positioning elongated sacrificial tubes in a PM body, the elongated sacrificial tubes having solvent inlet channels therein. The PM body is consolidated utilizing a HIP process to produce a component preform in which the elongated sacrificial tubes are embedded. The elongated sacrificial tubes are removed by directing a solvent into the solvent inlet channels to create shaped cavities within the component preform. Prior to or after chemical dissolution of the elongated sacrificial tubes, further processing of the component preform is performed to produce the PM component.

Embodiments of a GTE rotor having shaped internal cavities is further provided. In one embodiment, the GTE rotor includes a rotor hub, a plurality of blades circumferentially spaced about the rotor hub and extending outward therefrom, and a plurality of shaped cavities located in the rotor hub and extending along curved paths. The shaped cavities can be, for example, stress distribution tunnels or cooling flow passages. The rotor hub is fabricated from a rotor preform composed of a consolidated PM alloy, while the plurality of shaped cavities are substantially defined by the removal of elongated sacrificial tubes from the rotor hub. The elongated sacrificial tubes are removed by directing a solvent into solvent inlet channels provided in the elongated sacrificial tubes.

BRIEF DESCRIPTION OF THE DRAWINGS

At least one example of the present disclosure will hereinafter be described in conjunction with the following figures, wherein like numerals denote like elements, and.

DETAILED DESCRIPTION

Figure 1:
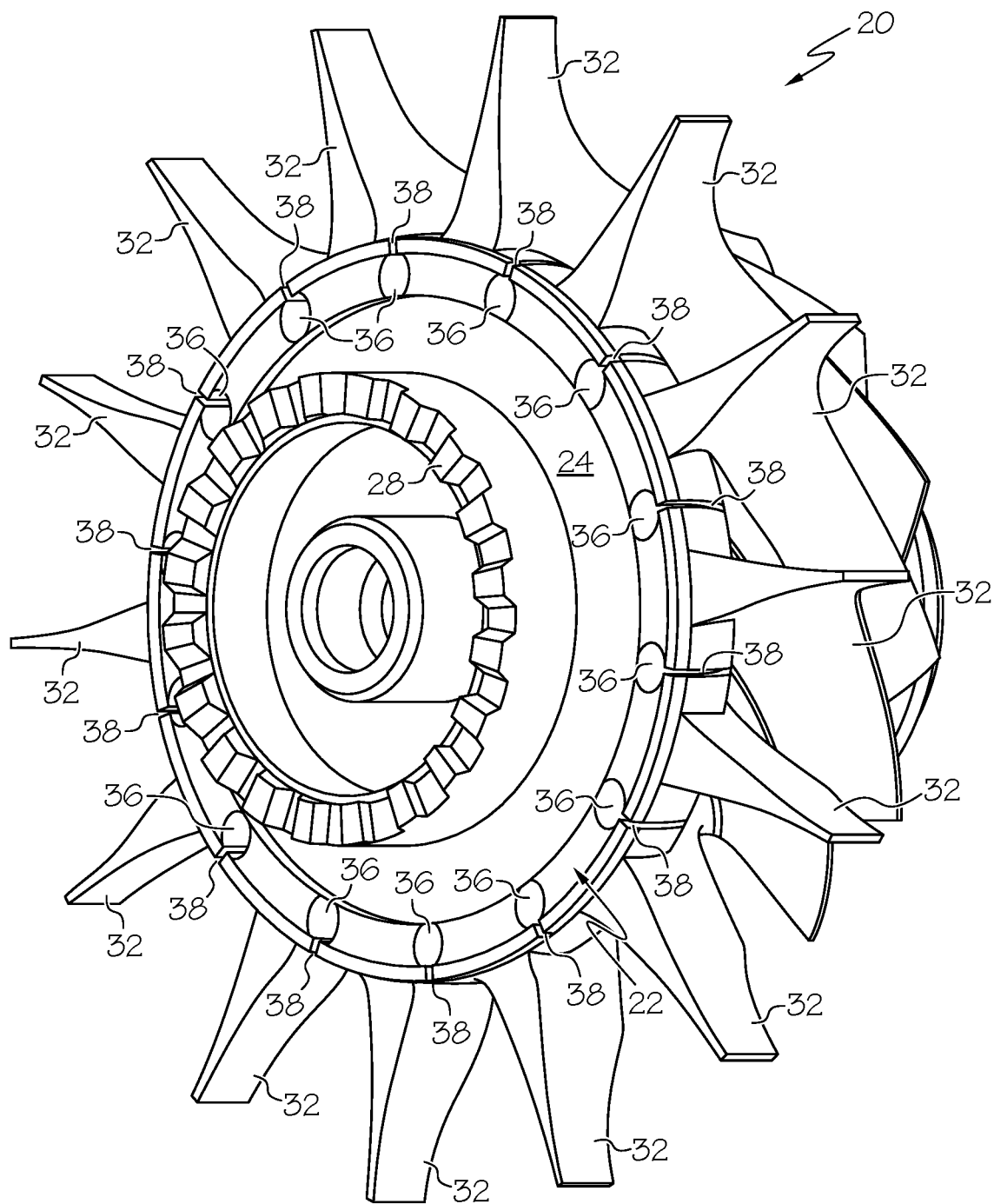
FIGS. 1, 2, and 3 are front isometric, side, and rear isometric views, respectively, of a radial turbine rotor suitable for within a GTE and including shaped internal cavities, as illustrated in accordance with an exemplary embodiment of the present disclosure.

The following Detailed Description is merely exemplary in nature and is not intended to limit the invention or the application and uses of the invention. Furthermore, there is no intention to be bound by any theory presented in the preceding Background or the following Detailed Description. As appearing herein, the term "shaped cavity" refers to a cavity or void imparted with a desired shape or internal geometry.

As described in the foregoing section entitled "BACKGROUND," GTE rotors can be fabricated by consolidating PM alloys utilizing a HIP process to produce a rotor preform, which is then further processed to yield the completed GTE rotor. In certain cases, it may be desirable to create shaped cavities within the GTE rotor, such as stress relief tunnels or cooling flow passages within the rotor hub region. However, as further noted above, such shaped cavities can have relatively complex three dimensional geometries and may include regions buried within the rotor hub such that no direct line-of-sight is provided thereto. Consequently, it can be difficult if not impossible to produce such shaped internal cavities utilizing conventional machining techniques.

A solution to the above-described problem is set-forth in U.S. patent application Ser. No. 14/022,611, filed on Oct. 24, 2013, assigned to the assignee of the instant application, and entitled "GAS TURBINE ENGINE ROTORS INCLUDING INTRA-HUB STRESS RELIEF FEATURES AND METHODS FOR THE MANUFACTURE THEREOF," which is hereby incorporated by reference. The '611 application describes methods for producing GTE rotors wherein (at least in some embodiments) solid, elongated sacrificial cores are embedded in a rotor preform, which is produced by consolidating a PM alloy utilizing a HIP process. As explained in the '611 application, the elongated sacrificial cores can be imparted with relatively complex three dimensional shapes, such as elongated shapes that twist about the rotational axis of the rotor and converge toward the rotational axis, when moving in a fore-aft direction. When removed, the elongated sacrificial cores leave in their place shaped cavities, such as stress distribution channels, which are likewise formed to have geometrically complex three dimensional shapes that extend into regions of the rotor hub that are not otherwise accessible from the exterior of GTE rotor. The '611 application further describes removal of the elongated sacrificial cores utilizing a chemical dissolution process, such as acid leaching.

The GTE rotor fabrication processes described in the '611 application are highly useful for producing a GTE rotor having shaped cavities within the rotor hub, which are otherwise difficult or impossible to produce utilizing conventional machining techniques. The present inventors have, however, recognized certain drawbacks associated with such GTE rotor fabrication processes. As a primary drawback, the chemical dissolution processes utilized to remove the solid, elongated sacrificial cores from the rotor hub or hub preform can be undesirably time consuming and may span several days. Additionally, such a prolonged chemical dissolution process can exacerbate acid attack within the rotor hub and undesired material removal in regions of the hub adjacent the end portions of the sacrificial cores, which are first dissolved by the acid or other solvent. The present inventors have determined that a significant reduction in the duration of the core dissolution process can be achieved through usage of elongated sacrificial tubes, which are fabricated to include solvent inlet channels, in the place of solid sacrificial cores. Testing indicates that, by directing an acid or other solvent into the solvent inlet channels after production of the rotor/hub preform, the sacrificial tubes can be removed in an abbreviated time period of, for example, a few hours. Acid attack within the rotor hub can also be minimized as a result. This solution presents another technical challenge, however, in that the sacrificial tubes can collapse during the high pressure HIP process if the solvent inlet channels are not reinforced or bolstered in some manner. The present inventors have thus further determined that that collapse of the sacrificial tubes can be impeded by filling the solvent inlet channels with a non-compressible material, by pressurizing the inlet channels during the HIP process, and/or by fabricating the sacrificial tubes to include reinforcement structures within the solvent inlet channels. Further description of these approaches is provided below.

As the manufacturing processes described herein are particularly well-suited for producing GTE rotors, the following describes exemplary embodiments of the HIP-based manufacturing processes in conjunction with the production of a GTE rotor having shaped internal cavities, such as cooling flow passages or stress relief channels. It is emphasized, however, that the HIP-based manufacturing process described herein can be readily adapted to produce other types of PM articles or components having shaped internal cavities, as well, whether or not such components are utilized within a GTE. As one example, embodiments of the manufacturing process can further be utilized to produce generator housings having shaped internal cavities, which can be utilized as plumbing features to conduct oil or another coolant, pumps, and bearing compartments. The following description, then, is offered by way of non-limiting illustration only and should not be considered to unduly restrict the scope of the invention, as defined by the appended claims. An exemplary embodiment of a GTE rotor, which can be produced utilizing embodiments of the HIP-based manufacturing process described herein, will now be described in conjunction with FIGS. 1-3.

Figure 2:
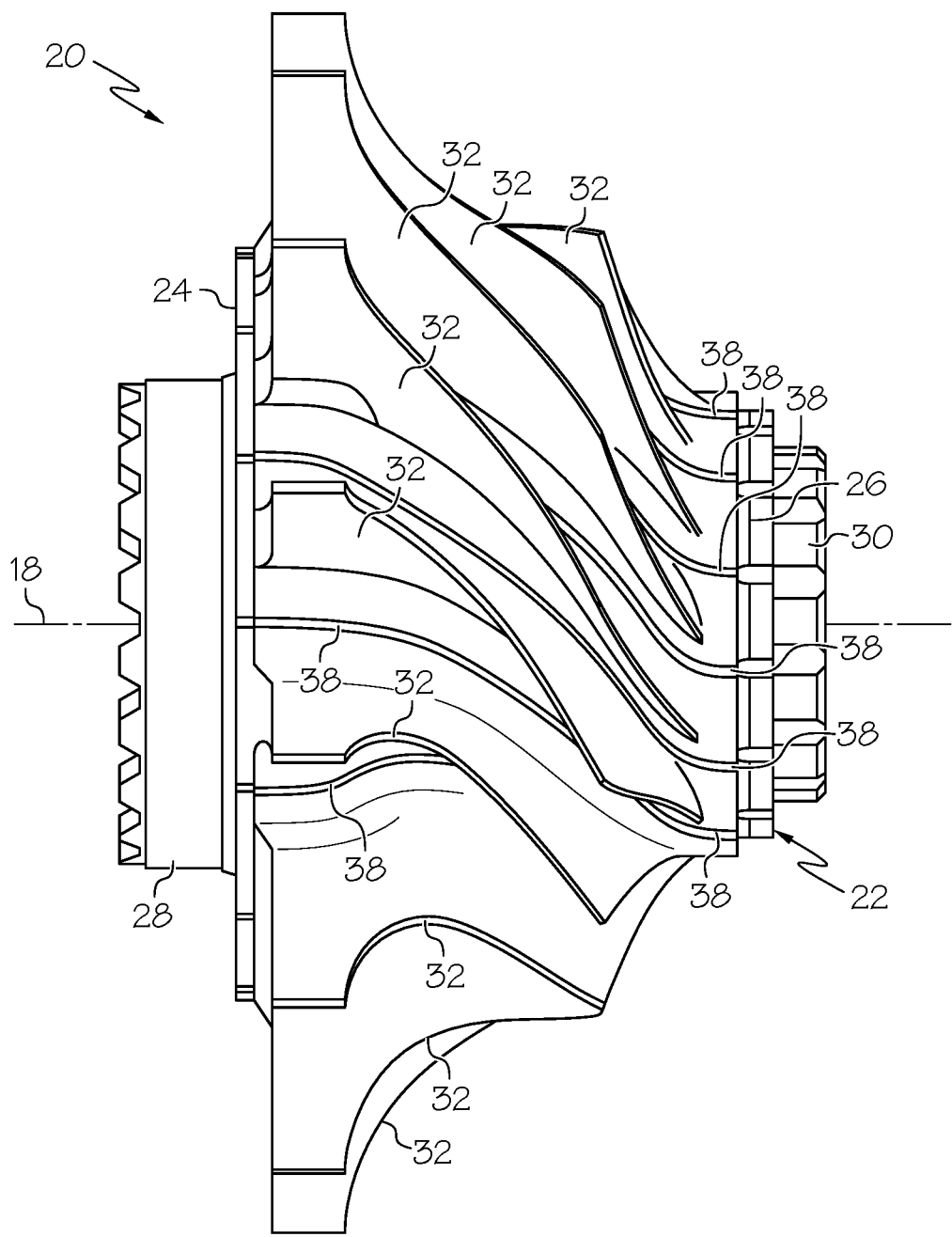
Figure 3:
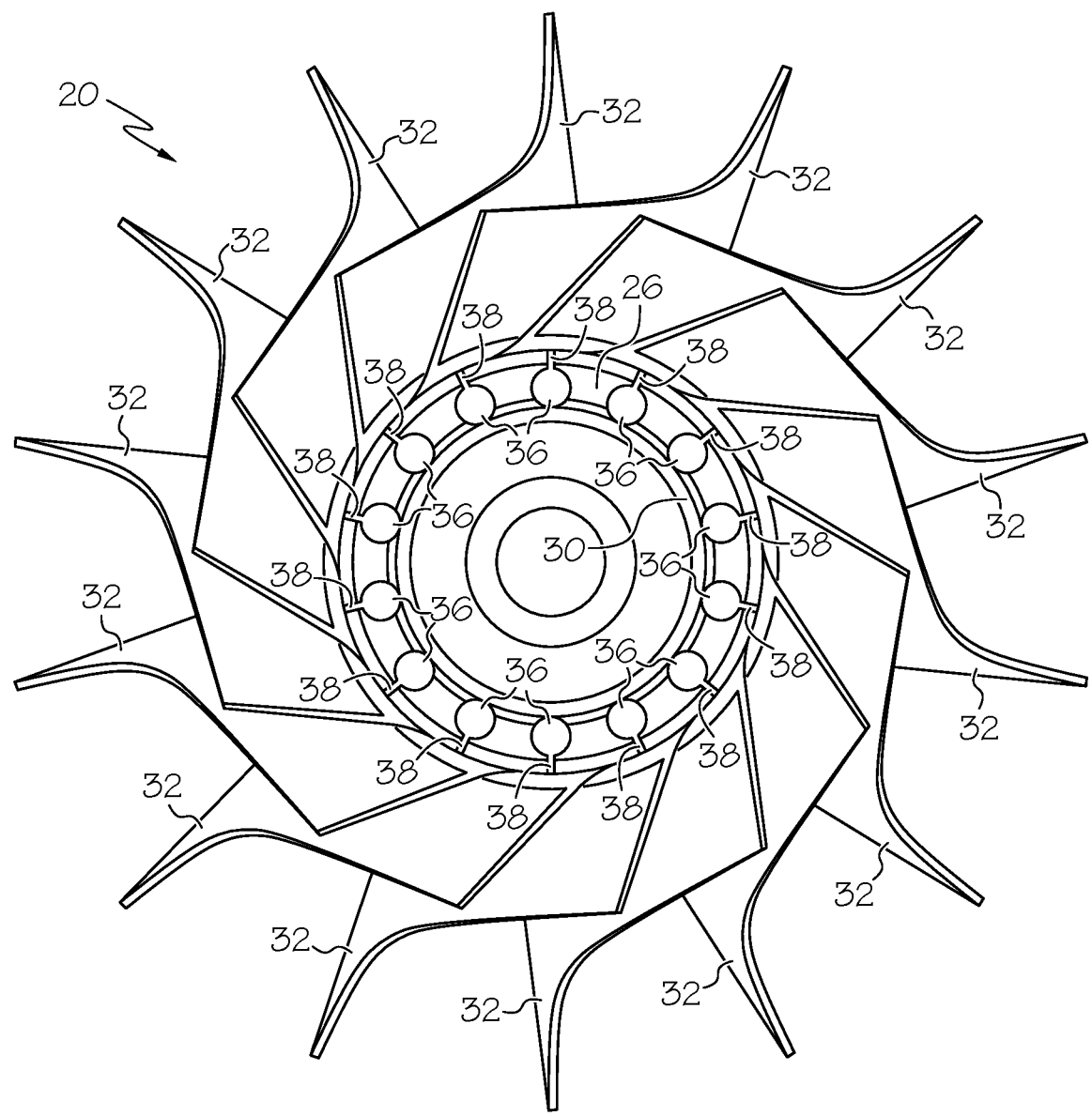

FIGS. 1, 2, and 3 are forward isometric, side, and aft isometric views, respectively, of a GTE rotor 20 that can be produced utilizing the fabrication method described below in conjunction with FIGS. 4-12. In this particular example, GTE rotor 20 is radial turbine rotor and will thus be referred to hereafter as "radial turbine rotor 20." In other embodiments, GTE rotor 20 can assume other forms, such as that of an axial turbine rotor, an axial compressor rotor, or a radial compressor rotor (also commonly referred to as an "impeller"). As shown in FIGS. 1-3, radial turbine rotor 20 includes a central body or hub 22 having a large outer diameter ("OD") face 24 (FIG. 1) and an opposing small OD face 26 (FIG. 3). Large OD face 24 and small OD face 26 are the upstream and downstream faces, respectively, of radial turbine rotor 20 in the illustrated example; although it will be noted that rotor 20 can alternatively be utilized as a radial compressor rotor with relatively few modifications, in which case large OD face 24 would serve as the downstream face of rotor 34, while small OD face 26 would serve as the upstream face thereof. The upstream or "inducer" portion of radial turbine rotor 20 (the leftmost portion of rotor 20 in FIGS. 1 and 2) serves as the inlet of rotor 20 and receives combustive gas flow in a radially inward direction. Conversely, the downstream or "exducer" portion of radial turbine rotor 20 (the rightmost portion of rotor 20 in FIGS. 1 and 2) serves as the outlet of rotor 20 and discharges combustive gas flow in an axial direction.

Radial turbine rotor 20 can be utilized within various different types of GTEs including, but not limited to, turbofan, turboprop, turboshaft, and turbojet engines, whether deployed onboard an aircraft, watercraft, or ground vehicle (e.g., a tank), included within an Auxiliary Power Unit (APU), included within industrial power generators, or utilized within another platform or application. When installed within a GTE, radial turbine rotor 20 is fixedly joined to a shaft such that rotor 20 rotates in conjunction with the shaft. Large OD face 24 of rotor hub 22 may be fabricated to include a curvic-type coupling feature 28, such as an annular castellated extension, to facilitate such a rotationally-fixed coupling. As shown most clearly in FIG.

1, curvic 28 projects axially from rotor hub 22 in an upstream direction to engage a mating curvic formed within or affixed to the trailing end of shaft 38 (not shown). Small OD face 26 may likewise be fabricated to include one or more tubular or annular ledges 30, which project axially in a downstream direction to pilot to a mating connector piece when rotor 20 is installed within a GTE. The instant example notwithstanding, the particular manner in which radial turbine rotor 20 is mounted within a particular GTE will vary amongst different embodiments.

A plurality of rotor blades 32 is circumferentially spaced about rotor hub 22 and projects outward therefrom. Blades 32 wrap or twist about the rotational axis of radial turbine rotor 20 (represented in FIG. 2 by dashed line 18). As shown most clearly in FIG. 3, rotor blades 32 follow the contour of the outer circumferential surface of hub 22, which gradually tapers downward in diameter when moving in a fore-aft direction; that is, when moving from the inducer portion of rotor hub 22 adjacent large OD face 24 toward the exducer portion of hub 22 adjacent small OD face 26. As rotor blades 32 follow the sloped contour of rotor hub 22, the blade-to-blade spacing decreases. The velocity of the combustive gas flow and the heat exposure of rotor hub 22 is typically highest in the region of radial turbine rotor 20 corresponding to the minimum blade-to-blade spacing (commonly referred to as the "throat region" of rotor 20). As a result, cracks may gradually develop within rotor hub 22 between blades 32 in the throat region if stress relief features are not provided to more uniformly distribute mechanical and thermal tangential/hoop stresses in this area. Cracks may also develop and propagate in other areas of rotor hub 22 (e.g., near the trailing edge of rotor hub 22 adjacent blades 32) if adequate stress relief features are not provided.

To decrease the likelihood of crack formation within rotor hub 22 and thereby improve the overall durability and operational lifespan of rotor 20, radial turbine rotor 20 can be further produced to include a number of intra-hub stress relief features. In the illustrated example, the intra-hub stress relief features are provided in the form of elongated stress distribution tunnels 36; the term "tunnel" denoting an elongated void or cavity that is least partially enclosed or buried within the rotor hub, as viewed from the exterior of rotor. Stress distribution tunnels 36 are interspersed with blades 32, as taken about the outer circumference of rotor 20. Stress distribution tunnels 36 thus extend within rotor hub 22 between neighboring of blades 32 or, more accurately, between the regions of rotor hub 22 located beneath adjacent blades 32. Stress distribution tunnels 36 extend from large OD face 24 (FIG. 2), through the body of rotor hub 22, and to small OD face 26 (FIG. 3). In so doing, tunnels 36 penetrate faces 24 and 26 shown in FIGS. 1 and 3, respectively. The cross-sectional shape and dimensions of tunnels 36 may remain substantially constant over their respective lengths. Alternatively, the cross-sectional shapes and dimensions of tunnels 36 can be varied over their respective lengths to optimize the stress concentration and associated low cycle fatigue life capability.

In the illustrated example, rotor hub 22 is fabricated to further include a plurality of stress relief slots 38, which extend from the outer circumferential surface of rotor 20 to stress distribution tunnels 36. Stress relief slots 38 may be formed as radially-penetrating channels or slits, which have widths less than the diameters of stress distribution tunnels 36. Stress relief slots 38 expose small portions of tunnels 36, as viewed from the exterior of rotor 20; however, the majority of stress distribution tunnels 36 remain buried or enclosed within the body of rotor hub 22 such that no direct line-of-sight is provided thereto. Stress relief slots 38 are formed in an outer circumferential surface of hub 22 to reduce mechanical and thermal tangential/hoop stresses around hub 22. Stress distribution tunnels 36 serve to more uniformly distribute stress that would otherwise occur near the bottom of slots 38 across a larger region of the parent material of rotor hub 22. In this manner, stress relief slots 38 and intra-hub stress distribution tunnels 36 cooperate to reduce stress risers and decrease fatigue in these regions to thereby reduce the likelihood of crack formation and propagation during operation of rotor 20. Stress distribution tunnels 36 may have any cross-sectional geometry suitable for performing this function; e.g., as indicated in FIGS. 1-3, tunnels 36 may be produced to have a generally circular, ovular, or teardrop-shaped cross-sectional geometry.

Stress distribution tunnels 36 and stress relief slots 38 generally follow the contour of the valley regions of rotor hub 22 located between the regions of hub 22 immediately below the roots or bases of blades 32. The curved paths followed by tunnels 36 and slots 38 are thus substantially parallel to the twisting, curved paths followed by blades 32; although it will be appreciated that the paths followed by tunnels 36 are angularly staggered and offset in a radially inward direction as compared to the paths followed by blades 32. The paths followed by tunnels 36 and slots 38 curve or bend in multiple dimensions, when moving along rotor hub 22 in a fore-aft direction (from the left to the right in FIGS. 1 and 2). In the case of radial turbine rotor 20, specifically, stress distribution tunnels 36 and stress relief slots 38 twist around the rotational axis 40 of rotor 20 (FIG. 2), when moving in a fore-aft direction, in essentially the same manner as do blades 32. Tunnels 36 and slots 38 also converge radially inward toward the rotational axis 40 of rotor 20 (FIG. 2) as they progress through rotor hub 22.

Stress relief slots 38 may be produced utilizing a conventionally-known material removal technique, such as Electrical Discharge Machining (EDM) plunging. However, EDM plunging and other known line-of-sight material removal techniques, such as drilling, are generally incapable of producing stress distribution tunnels 36 due to the buried or enclosed nature of tunnels 36 and the non-linear paths followed thereby. An example of a manufacturing method enabling the fabrication of stress distribution tunnels 36 in addition to stress relief slots 38 will now be described in conjunction with FIGS. 4-9. While described below in conjunction with the manufacture of exemplary radial turbine rotor 20 shown in FIGS. 1-3, specifically, it is emphasized that the below-described fabrication method can be utilized to produce other types of GTE rotors, such as axial turbine rotors, radial compressor rotors, and axial compressor rotors, having stress distribution tunnels, cooling flow passages, or another type of shaped internal cavity. Additionally, it should be noted that the fabrication steps described below can be performed in alternative orders, certain steps may be omitted, and additional steps may be performed in alternative embodiments. Certain steps in the manufacture of GTE rotors may be well-known and, in the interests of brevity, will only be mentioned briefly herein or will be omitted entirely without description of the well-known process details.

Figure 4:
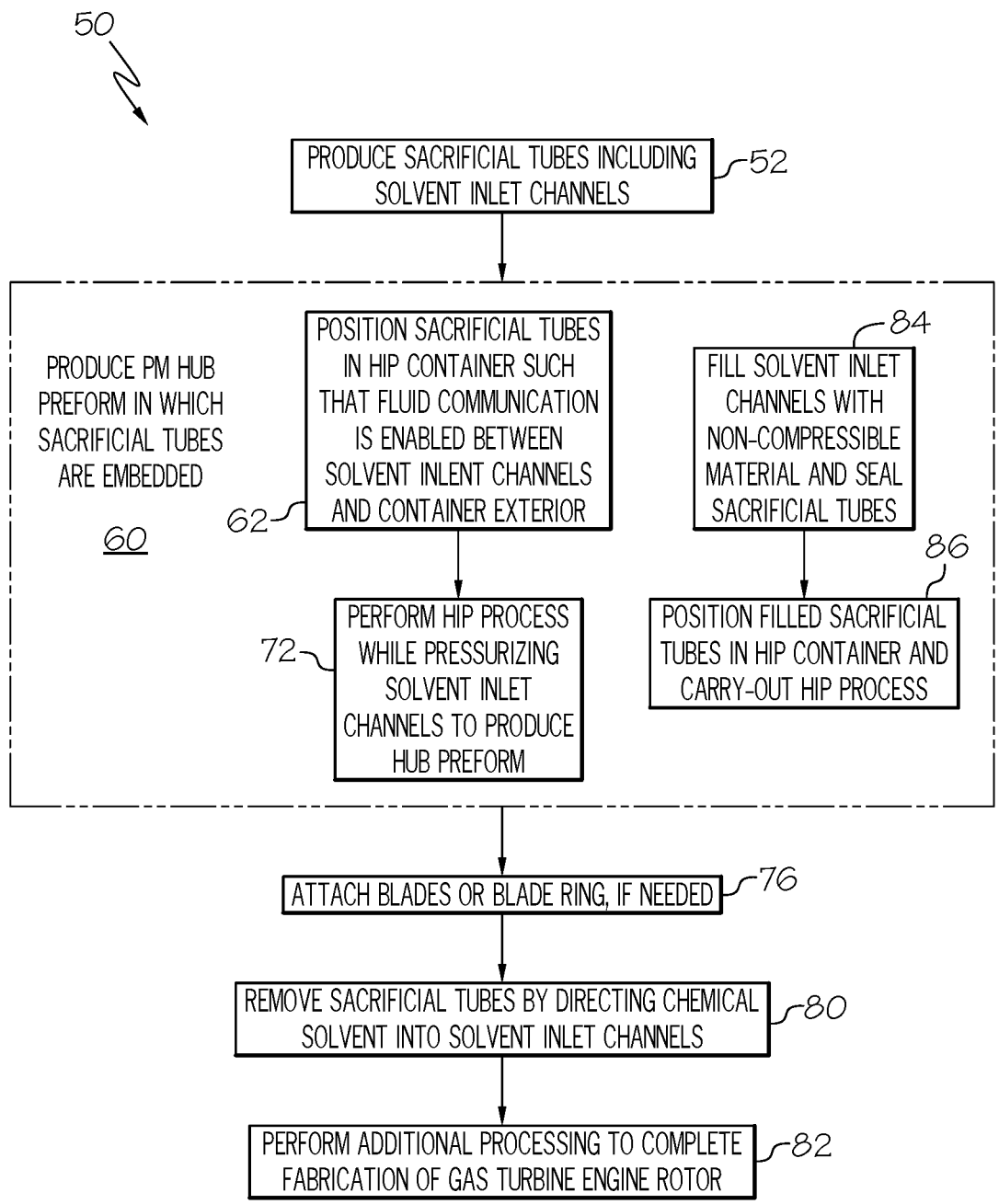
FIG. 4 is a flowchart setting-forth an exemplary method suitable for producing the radial turbine rotor shown in FIGS. 1-3 or another gas turbine engine rotor having shaped internal cavities, as illustrated in accordance with an exemplary embodiment of the present disclosure.
Figure 5:
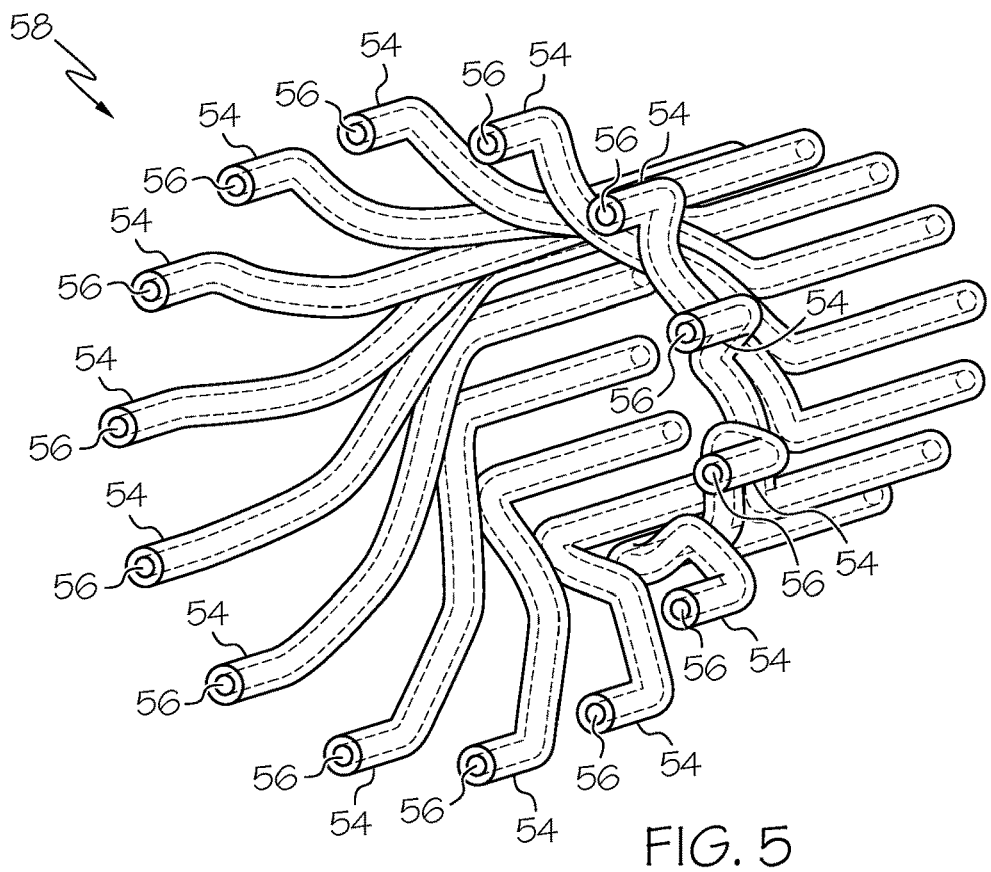
FIG. 5 is an isometric view of an annular array of sacrificial tubes that can be utilized during performance of the exemplary manufacturing method set-forth in FIG. 4.

FIG. 4 is flowchart setting-forth an exemplary HIP-based manufacturing method 50 suitable for producing a GTE rotor, such as radial turbine rotor 20 shown in FIGS. 1-3. Manufacturing method 50 commences at STEP 52 with the production of one or more sacrificial tubes having solvent inlet channels extending therein. FIG. 5 illustrates a number of elongated sacrificial tubes 54, which can be produced during STEP 52 of method 50 (FIG. 4). As can be seen in FIG. 5, elongated sacrificial tubes 54 are each fabricated to include a single solvent inlet channel 56, which extend through or penetrates both tube ends. In further embodiments, solvent inlet channels 56 may penetrate only one tube end and/or multiple channels 56 can be formed in a single tube 54. Solvent inlet channels 56 extend along the longitudinal axes of sacrificial tubes 54 and may be substantially coaxial therewith. The diameters of solvent inlet channels 56 are preferably maximized to reduce the wall thickness of sacrificial tubes 54 and thereby facilitate removal of tubes 54 during the below-described chemical dissolution process (providing, of course, that tubes 54 are still imparted with adequate structural integrity to remain intact during the below-described HIP process). In this regard, sacrificial tubes 54 can be produced such that the diameters of channels 56 are at least one half the outer diameters of tubes 54 in an embodiment. In other embodiments, the wall thickness of elongated sacrificial tubes 54 can be between about 0.250 and about 250 millimeters (mm), while the diameters of channels 56 are between about 0.250 and about 250 mm. In still further embodiments, the tube wall thickness and the channel diameter can be greater than or less than the aforementioned ranges.

Sacrificial tubes 54 are fabricated to have dimensions and outer cross-sectional shapes corresponding to the desired dimensions and cross-sectional shapes of shaped internal cavities to be produced within the finished PM component. In the case of radial turbine rotor 20 (FIGS. 1-3), specifically, sacrificial tubes 54 are produced to have shapes and dimensions corresponding to stress distribution tunnels 36. Thus, in embodiments wherein stress distribution tunnels 36 are desirably imparted with circular, teardrop-shaped, or ovular cross-sectional profiles, sacrificial tubes 54 can likewise be produced to have corresponding outer geometries, as considered in cross-section taken along a cut plane orthogonal to the respective longitudinal axes of tubes 54. In further embodiments, sacrificial tubes 54 can be produced to have other outer cross-sectional geometries, including irregular and polygonal geometries.

Sacrificial tubes 54 can be fabricated from any material allowing selective removal over the parent material of the rotor preform (or other HIP article). In many embodiments, the rotor preform will be produced from a powdered nickel- or cobalt-based superalloy. In certain implementations, sacrificial tubes 54 can be composed of quartz, a ceramic, or an alloy that can be selectively removed from the rotor preform utilizing a chemical dissolution process; e.g., by way of non-limiting example only, the cores may be composed of a mild or low carbon steel, which can be removed utilizing an acid leaching process of the type described below. If desired, a coating material may be applied over the exterior of sacrificial tubes 54 to reduce potential bonding with the hub perform and/or to impart a desired surface finish to the tunnels produced or revealed by the below-described removal of the sacrificial cores. In this case, the coating material may be applied by dipping followed by a drying or heat treat cycle. Coating materials suitable for this purpose may include, but are not limited to, zirconia, silica, and zircon.

As indicated in FIG. 5, sacrificial tubes 54 can be arranged in an annular array 58 when positioned into the capsule or container utilized during the HIP process (described below in conjunction with PROCESS BLOCK 60). In certain embodiments, sacrificial tubes 54 can be positioned in annular array 58 prior to placement in the HIP container. In this case, The relative positioning of elongated sacrificial tubes 54 can be maintained by attaching the tube ends to one or more physical structures (not shown) to produce an interconnected array or "spider." Welding, clamping, or another attachment technique can be utilized for this purpose. In other embodiments, sacrificial tubes 54 can be positioned in array 58 when installed within the HIP container. In this latter case, sacrificial tubes 54 can be maintained in their desired position by attachment (e.g., welding) to one or more walls of the HIP container, such as the lid of the HP container. If desired, the HIP container can be produced to include features to which sacrificial tubes 54 register or pilot to ensure proper positioning within array 58. When arranged into array 58, sacrificial tubes 54 follow curved paths that twist about the centerline of the rotor hub and which converge radially inward in a fore-aft direction (generally from the left to the right in FIG. 5) in essentially the same manner as do stress distribution tunnels 36 described above in conjunction with FIGS. 1-3. In this manner, sacrificial tubes 54 can be arranged in array 58 and embedded within the rotor preform at locations corresponding to the desired paths and locations of stress distribution tunnels 36, respectively, in the completed rotor hub.

Figure 6:
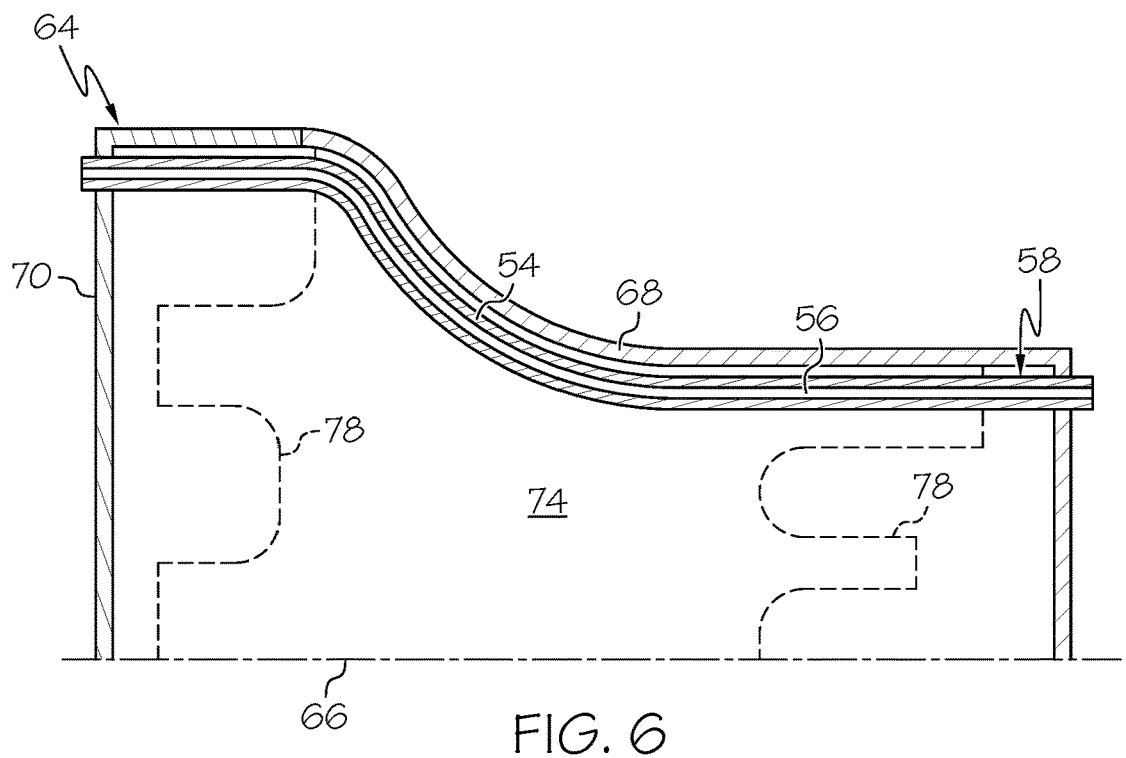
FIGS. 6-9 illustrate the radial turbine rotor shown in FIGS. 1-3 at various stages of manufacture and produced in accordance with the exemplary manufacturing method set-forth in FIG. 4.
Figure 7:
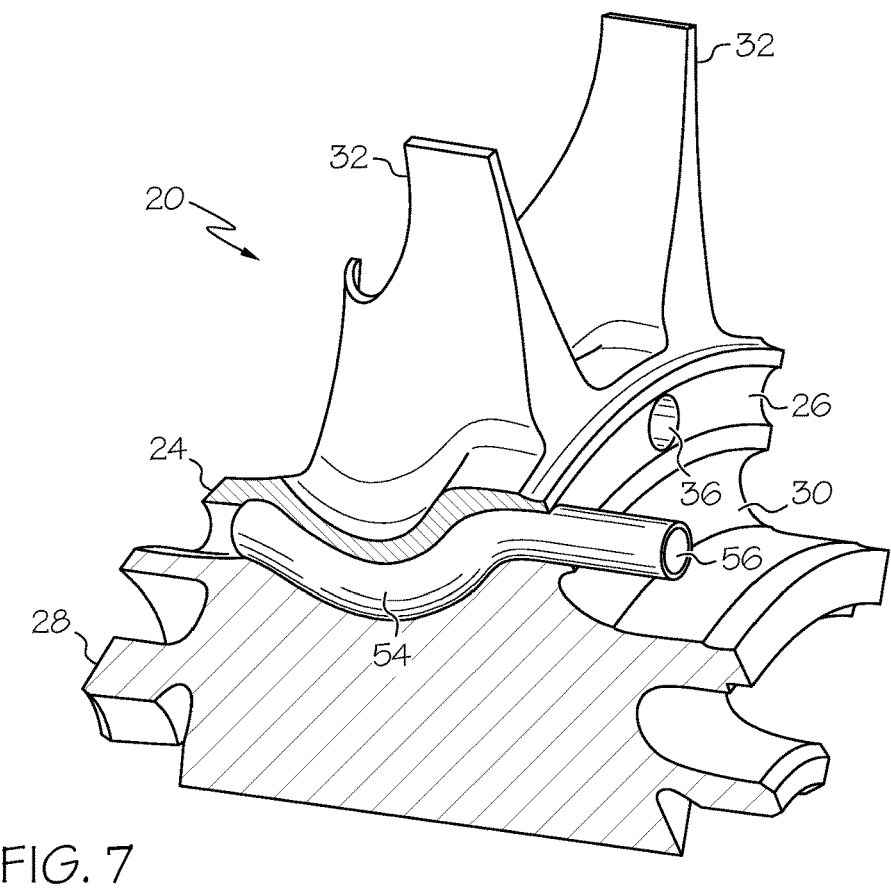

After production of elongated sacrificial tubes 54, a HIP process is carried-out to produce a rotor preform in which tubes 54 are embedded (PROCESS BLOCK 60, FIG. 4). The steps performed during PROCESS BLOCK 60 will vary amongst embodiments depending, at least in part, upon whether sacrificial tubes 54 are left unfilled during the HIP process or are instead filled with a non-compressible material, as described more fully below in conjunction with FIG. 10. In implementations wherein sacrificial tubes 54 are left unfilled during the HIP process, tubes 54 can be positioned in the HIP container such that solvent inlet channels 56 can fluidly communicate with the exterior of the HIP container (STEP 62, FIG. 4). This may be more fully appreciated by referring to FIG. 6, which is a cross-sectional view of the upper half of a HIP container 64 having a centerline 66. HIP container 64 includes a main vessel 68 having an open end and an internal cavity. A lid 70 can be positioned over the open end of vessel 68 to sealingly enclose the cavity therein. Sacrificial tubes 54 are positioned within HIP container 64 such that one or both of the tube ends extend through one or more walls of the container. For example, as indicated in FIG. 6, sacrificial tubes 54 can be positioned within container 64 such that one end of each tube 54 extends through and possibly projects from lid 70 (considered a wall of container 64), while the other tube end extends through and possibly projects from the opposing endwall of container 64. To preserve a hermetic or airtight environment within HIP container 64, seals are created between the penetrating ends of sacrificial tubes 54 and container 64 by, for example, circumferential welding. Advantageously, this approach not only fluidly couples solvent inlet channels 56 to the ambient environment surrounding HIP container 64, but also secures sacrificial tubes 54 in their desired positions within array 58.

After positioning sacrificial tubes 54 within HIP container 64 and further loading the selected PM alloy into container 64, the HIP process is carried-out (STEP 72, FIG. 4). As identified in FIG. 6, the HIP process yields a rotor preform 74 (identified in FIG. 6) in which sacrificial tubes 54 are embedded. Afterwards, rotor preform 74 is subject to further processing and sacrificial tubes 54 are removed to yield the completed GTE rotor, such as GTE rotor 20 (FIGS. 1-3). The additional processing steps can be performed prior to, after, or both prior to and after removal of sacrificial tubes 54. The particular process steps performed to complete fabrication of the GTE rotor will vary amongst embodiments. In embodiments wherein the rotor preform lacks blades, individual blades or a blade ring can be bonded to the exterior of rotor perform 74, as indicated at STEP 76 of method 50 (FIG. 4). Alternatively, the rotor preform 74 can be produced to include radially-projecting blocks of material, which are then machined to define the rotor blades. Further description of such processes is provided in the '611 application. Additionally, machining can be performed to define the more detailed features of the rotor hub. This is indicated in FIG. 6 by dashed lines 78, which generally indicate the cross-sectional profile of the finished rotor hub. As can be seen, if sacrificial tubes 54 have not yet been removed from the rotor preform, the end portions of tubes 54 can be removed in conjunction with machining of rotor preform 74. The resultant structure is shown in cutaway in FIG. 7, with a single tube 54 partially shown to more clearly illustrate the manner in which sacrificial tubes 54 extend through the hub preform or hub to define stress distribution tunnels 36.

Advancing to STEP 80 of exemplary method 50 (FIG. 4), sacrificial tubes 54 are next removed to yield stress distribution tunnels 36 (FIGS. 1-3). As appearing herein, the "yield" is utilized to refer to the production of stress distribution tunnels 36 in their final form, unoccupied by tubes 54. Sacrificial tubes 54 are removed by directing a solvent into solvent inlet channels 56 by, for example, submerging the rotor preform or rotor in a chemical bath or by actively flowing the solvent through channels 56. Agitation by, for example, vibration can also be utilized to help accelerate the dissolution process. The solvent utilized will depend upon the material from which sacrificial tubes 54 are produced. In embodiments wherein sacrificial tubes 54 are composed a mild or low carbon steel, an acid leaching process may be employed to remove tubes 54 by exposure to a nitric acid and/or hydrofluoric acid solution. Due to the presence of solvent inlet channels 56, the volume of sacrificial tubes 54 to be removed is reduced, while the internal surface area of tubes 54 exposed to the solvent is greatly increased. As a result, the chemical dissolution process can be performed with much greater efficiency than if sacrificial tubes 54 were replaced by solid sacrificial cylinders or cores. Additionally, this minimizes acid attack along the interior surfaces of stress relief tunnels 36 (FIGS. 1-3 and 7) to help prevent undesired material loss from the rotor hub. In contrast, when a solid core is removed by chemical dissolution, considerably more acid attack will typically occur near the core ends, which are first exposed to the acid and removed. As a result, there exists a detectable, measurable, and indelible structural difference between a GTE rotor (e.g., GTE rotor 20) produced utilizing the processes described herein and a GTE rotor produced by chemical dissolution of solid sacrificial cores.

As noted above, additional processing of the rotor preform can be performed after removal of sacrificial tubes 54, as needed. For example, as indicated by STEP 82 of exemplary method 50 (FIG. 4), additional processing can be performed to complete fabrication of GTE rotor 20 (FIGS. 1-3). Referring briefly once again to FIGS. 1-3, such additional processing can include formation of stress relief slots 38 in an outer circumferential portion of rotor hub 22. Stress relief slots 38 are conveniently formed utilizing EDM plunging or other machining technique. As noted above, stress relief slots 38 are formed to extend to stress distribution channels 76. In further embodiments, stress relief slots 38 may be formed prior to the removal of sacrificial tubes 54. Additionally, an Environmental Barrier Coat (EBC), a Thermal Barrier Coat (TBC), or other coating systems or layer may be produced over the outer surface of blades 32 and/or hub 22; e.g., in one embodiment, an EBC coating is formed over the gas path surfaces of completed radial turbine rotor 30. Additional machining can also be performed, as appropriate. The end result is the completed radial turbine rotor 30 shown in FIGS. 1-3.

There has thus been described an exemplary embodiment of a fabrication process suitable for producing a GTE rotor having shaped internal cavities. In the above-described embodiment, the solvent inlet channels are pressurized to prevent or at least impeded the collapse of the sacrificial tubes during the high pressure HIP process. In further embodiments, collapse of the sacrificial tubes during the HIP process can be prevented or impeded by filling the solvent inlet channels with a non-compressible material; the term "non-compressible" utilized herein to generally refer to a material that resists compressible during the HIP process to a greater extent than would a hollow void or a soft material to prevent or at least substantially deter collapse of the sacrificial tubes. An example of such an alternative implementation is further represented in FIG. 4 by STEPS 84 and 86 (encompassed by PROCESS BLOCK 60) and will now be described in conjunction with FIGS. 8 and 9.

Figure 8:
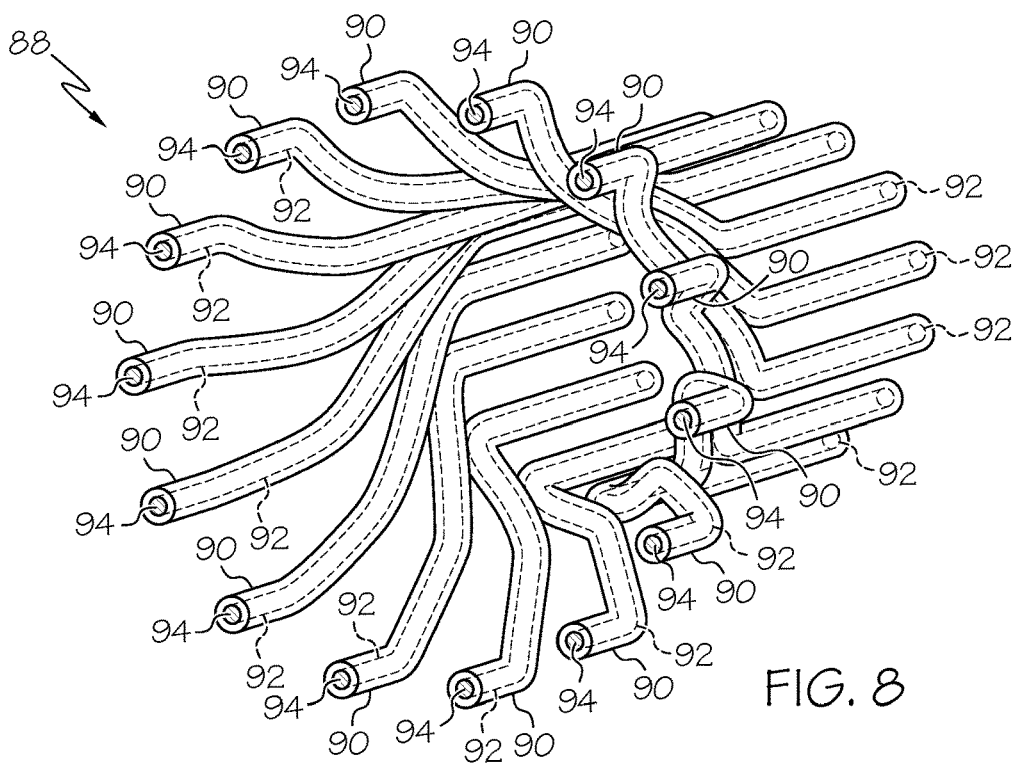

In embodiments wherein collapse of the sacrificial tubes is accomplished by filling the solvent inlet channels with a non-compressible material, the tube can be filled with the non-compressible material and sealed during STEP 84 of exemplary method 50 (FIG. 4). FIG. 8 illustrates an array 88 of sacrificial tubes 90, which have solvent inlet channels 92 filled with a non-compressible material 94. The non-compressible material 94 utilized to fill solvent inlet channels 92 can be any non-compressible material that resists collapse of sacrificial tubes 90 during the HIP process, that is chemically compatible with the parent material of tubes 90, and that can be removed from sacrificial tubes 90 without damaging the rotor preform after the HIP process. In one embodiment, the sacrificial material is a powder packing. The powder packing can be composed of a material, such as tungsten or a ceramic material, having a melt point exceeding that of tubes 90. In this case, the powder packing will remain solid through the HIP process. Alternatively, the powder packing can have a lower melt point than tubes 90 and may liquefy during the HIP process. In this case, Resonant Acoustic Mixing or another vibration technique can be utilized to ensure that minimal voiding occurs within the powder packing. In further embodiments, non-compressible material 94 can be a liquid introduced into sacrificial tubes 90. In still further embodiments, non-compressible material 94 can be metal cores, which occupy or fill the solvent inlet channels 92, which are solid at room temperature (defined herein as a 20° Celcius) and which each have a melt point less than that of tubes 90; e.g., in this embodiment, tubes 90 can each be composed of quartz surrounding an aluminum core. In this case, the metal cores can be removed by heating to a temperature exceeding the melt point of the metal cores, while allowing the molten metal cores to drain from their respective solvent inlet channels in a liquefied state, as described below.

Figure 9:
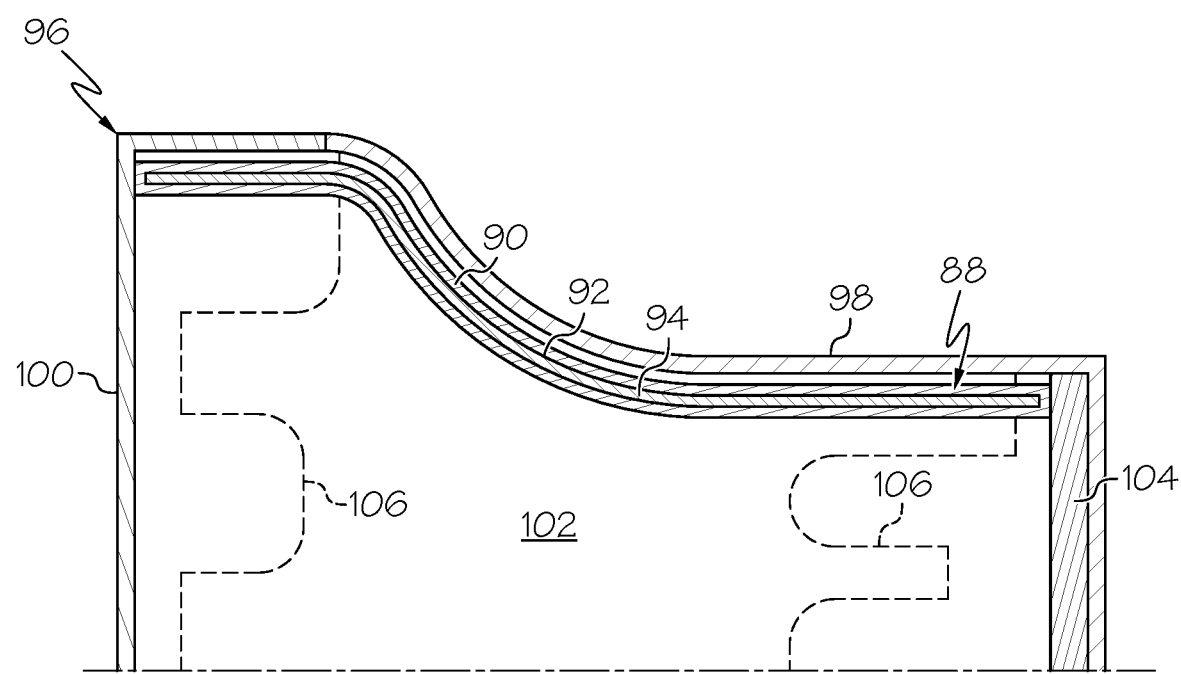

After filling solvent inlet channels 92 with the non-compressible material 94, the open ends of tubes 90 are sealed. Sealing of the tube ends can be accomplished by crimping or otherwise pinching the open tube ends after filling. In another embodiment, sealing of the tube ends is accomplished by welding or otherwise attaching a cap piece onto the open tube ends. Afterwards, the filled sacrificial tubes 90 are positioned within a HIP container and the above-described HIP process can be carried-out. FIG. 9 illustrates sacrificial tubes 90 (one of which is shown) after positioning within a HIP container 96 having a main vessel 98 and a lid 100. Additionally, in this particular example, sacrificial tubes 92 are maintained in their desired position by attachment to a retainer piece 104, which may be matingly seat on the floor of vessel 98. As can be seen, tubes 90 are wholly contained within container 96 in this embodiment. The above-described HIP process can then be carried-out, as described above, to yield rotor preform 102 (identified in FIG. 9 and substantially identical to rotor preform 74 shown in FIG. 6). Afterwards, additional processing of rotor preform 102 and removal of sacrificial tubes 90 can be performed to complete fabrication of the GTE rotor (the final geometry of the rotor hub represented in FIG. 9 by dashed lines 106). When it is desired to dissolve sacrificial tubes 90, the closed ends of tubes 90 can be severed to reveal the filled solvent inlet channels 92. Non-compressible material 94 is then removed from solvent inlet channels 92 by, for example, gravity-assisted drainage, flushing (e.g., utilizing forced water or airflow), or the like. Vibration or heating can also be utilized to facilitate removal of the non-compressible filler material; e.g., in embodiments wherein material 94 assumes the form of metal (e.g., aluminum) cores, which are solid at room temperature, the cores can be heated to an elevated temperature sufficient to liquefy and facilitate outflow of the melted cores. Additional processing steps can then be carried-out to produce the completed GTE rotor (e.g., radial turbine rotor 30 shown in FIGS. 1-3), form rotor perform 102, as previously described.

Figure 10:
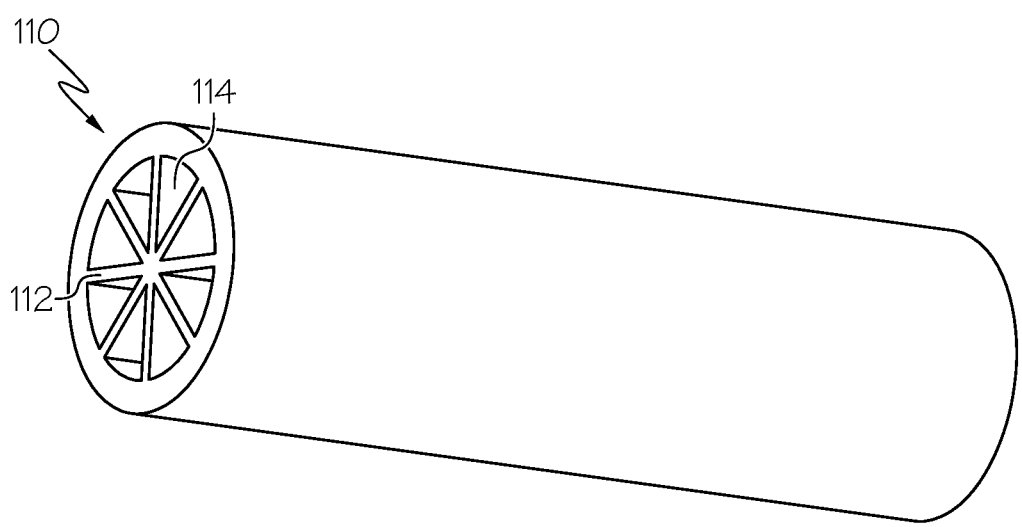
FIG. 10 is an isometric view of a sacrificial tube having internal reinforcement structures and suitable for usage in further embodiments of the GTE rotor manufacturing method.

There have thus been described multiple exemplary embodiments of a method for producing a GTE rotor utilizing a HIP-based PM-consolidation process, which enables the production of shaped cavities within the GTE rotor. As described above, the shaped cavities are produced, at least in part, by the removal of elongated sacrificial tubes having solvent inlet channels therein. The solvent inlet channels allow a significant reduction in the time required to chemically dissolve the sacrificial tubes after the HIP process. As further described above, collapse or crushing of the sacrificial tubes can be avoided or at least deterred during the HIP process by pressuring the solvent inlet channels (e.g., by fluidly coupling the channels to the environment of the HIP furnace) or by filling the solvent inlet channels with a non-compressible material, which is removed after the HIP process and prior to chemical dissolution of the tubes. Additionally or alternatively, the sacrificial tubes can be produced to include internal reinforcement structures within the solvent inlet channels. For example, and referring briefly to FIG. 10 illustrating a segment of a sacrificial tube 110, the sacrificial tubes can be produced to include a reinforcement structure 112 in the form of a number of radial spokes or struts, which are located within the solvent inlet channel 114 and which resist compression of tube 110 during the high pressure HIP process. Internal reinforcement structure 112 can be produced in conjunction with the body of tube 110 utilizing, for example, an extrusion or three dimensional printing process. Alternatively, reinforcement structure 112 can be produced separately from the body of tube 110 and subsequently press-fit into solvent inlet channel 114. The portions of solvent inlet channel 114 not occupied by reinforcement structure 112 can be pressurized or further filled with a non-compressible material during the HIP process; however, this is not necessary in all embodiments such that further implementations of the above-described method can be carried-out by fabricating the sacrificial tubes to include such reinforcement structures without fluidly coupling the solvent inlet channels to the HIP furnace environment or filling the channels with a non-compressible material.

In conclusion, it is once again emphasized that, while described above in conjunction with the production of a particular type of GTE rotor (i.e., a radial turbine rotor) having a particular type of shaped cavity (i.e., stress distribution tunnels), the above-described fabrication methods can be utilized to produce other types of GTE rotors having shaped cavities, whether assuming the form of stress distribution tunnels, cooling flow passages, or another type of shaped cavity. More generally, it is again emphasized that the HIP-based manufacturing process described herein can be readily adapted to produce other types of PM articles or components having shaped internal cavities, as well, whether or not such components are utilized within a GTE. Such additional PM components include, but are not limited to, generator housings having integral plumbing features, as produced by removal of sacrificial tubes of the type described above.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A method for manufacturing a Powdered Metal (PM) component, the method comprising:
   positioning elongated sacrificial tubes in a PM body, the elongated sacrificial tubes twisting about an axis of the PM body and converging toward the axis when moving along the axis, the elongated sacrificial tubes comprising solvent inlet channels and longitudinal axes along which the solvent inlet channels extend;
   consolidating the PM body utilizing a Hot Isostatic Pressing (HIP) process to produce a component preform in which the elongated sacrificial tubes are embedded;
   chemically dissolving the elongated sacrificial tubes by directing a solvent into the solvent inlet channels to create shaped cavities within the component preform; and
   prior to or after chemical dissolution of the elongated sacrificial tubes, further processing the component preform to produce the PM component.

2. The method of claim 1 further comprising providing internal reinforcement structures within the solvent inlet channels, which resist collapse of the elongated sacrificial tubes during the HIP process.

3. The method of claim 1 further comprising filling the solvent inlet channels with a non-compressible material prior to consolidating the PM body.

4. The method of claim 1 further comprising dimensioning the solvent inlet channels to have diameters at least one half outer diameters of the elongated sacrificial tubes.

5. The method of claim 1 further comprising applying a coating material over an exterior of the sacrificial tubes prior to consolidating the powdered metal body, the coating material comprising zirconia, silica, zircon, or a combination thereof.

6. The method of claim 1 further comprising pressurizing the solvent inlet channels during the HIP process to prevent collapse of the solvent inlet channels.

7. The method of claim 6 wherein the PM body is disposed within a container during the HIP process, and wherein pressurizing comprises maintaining fluid communication between the solvent inlet channels and an exterior environment of the container during the HIP process.

* * * * *